Oct. 4, 1949.    W. WEITZEN    2,483,448
OIL TANK ADAPTED FOR OIL DILUTION AND DEAERATION
Filed Oct. 5, 1944
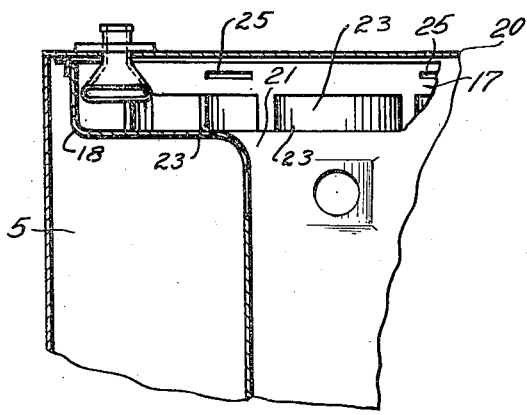
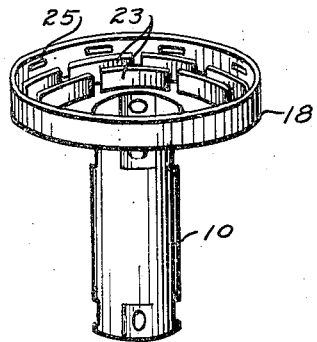
INVENTOR.
WILLIAM WEITZEN
BY Joseph Ch. Hazell
and
Chade Koontz
ATTORNEYS Patented Oct. 4, 1949

2,483,448

UNITED STATES PATENT OFFICE 2,483,448

OIL TANK ADAPTED FOR OIL DILUTION AND DEAERATION

William Weitzen, Dayton, Ohio

Application October 5, 1944, Serial No. 557,359

6 Claims. (Cl. 183—2.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to oil tanks and more particularly to an oil tank for use in airplane engines employing the dry sump system of lubrication.

In order to facilitate starting of the aircraft engine in cold weather, it is customary, when shutting down for the day, for the pilot to thin his oil by adding up to thirty percent gasoline thereto, depending on the anticipated temperature. Addition of gasoline to the oil decreases the oil's viscosity and insures proper lubrication of the engine when it is restarted cold. The addition of the gasoline to the oil raises the level of the liquid in the hopper which in oil tanks now in use, forces the diluted oil into the fresh oil. This indiscriminate mixing of the diluted oil with the fresh oil in the main tank reduces the proportion of gasoline in the circulating oil by an indeterminate amount and makes uncertain the proportion of gasoline in the mixture.

One object of the present invention is to provide an oil tank for use in a dry sump system of lubrication in which intermingling of the thinned oil with the main oil supply is reduced to a minimum.

A still further object is to provide an oil tank for use in a dry sump system of engine lubrication which will effectively deaerate the oil returned from the scavenging pump to the oil tank.

Still further objects will become apparent upon considering the following specification which when taken in consideration with the accompanying drawings illustrate one form of the invention.

In its broad aspect the invention comprises a main oil tank, a circulating oil hopper within the main oil tank having apertures therethru, and valve means for the apertures to control the flow of oil from the main oil tank to the hopper.

In another aspect the invention comprises a main oil tank, a circulating oil hopper in the main oil tank, a tray formed above the hopper and having an aperture therethrough communicating with the hopper and means to discharge oil onto the tray to deaerate the oil.

In the drawing:

Fig. 1 is a cross section of an oil tank embodying the present invention;

Fig. 2 is a partial cross section taken on line 2—2 on Fig. 1; and

Fig. 3 is a perspective view of the oil hopper per se.

Referring to the drawings, the oil tank 5 is mounted on a sump 6 by means of bolts or other conventional fastening means. The sump 6 is provided with an upstanding flange 7 which receives the circulating oil hopper 10. The sump 6 has an outlet 11 which is provided with a pipe 12 leading to an oil pressure pump (not shown) which supplies oil under pressure to those parts of the engine requiring lubrication.

The circulating oil hopper 10 may be joined to the flange 7 by welding or brazing, or may be made a slide fit over the flange to facilitate periodic cleaning of the tank.

The hopper 10 has a plurality of flat areas, with apertures 14 therethrough adjacent the lower end of the hopper 10. Inwardly opening flap valves 15 are mounted on hinges 16 on the flat areas of the hopper 10 to control the passage of oil through the apertures 14 from the tank 5 into the hopper 10. A second plurality of apertures 14' is formed on flattened areas adjacent the upper end of the hopper, and are controlled by inwardly opening flap valves 15' mounted on hinges 16'.

The upper end of the hopper 10 has a circular receiving tray 17 connected to receive oil returned from the engine thereon. The tray 17 has an upstanding edge 18 which is receivable in a downturned flange 19 fixed in a top 20 of the oil tank 5.

The center of the tray 17 has an aperture 21 therethru, which blends into the hopper 10 in a gradual curve 22 so as to create a minimum of turbulence in oil flowing off the tray and into the hopper.

The tray 17 has a plurality of vertical circumferential baffles 23 mounted thereon to provide a circuitous path for the oil from an oil inlet nozzle 24 to the hopper 10.

The oil inlet nozzle 24 is mounted in the top 20 of the main tank 5 and is provided with a thin wide outlet adapted to discharge the oil under pressure from a scavaging pump (not shown) on to the tray 17.

The top portion of the upstanding edge 18 of the tray 17 is provided with a plurality of vents 25 which permit air from the returning oil to escape to the main tank 5 from whence it is conducted to the atmosphere through a vent pipe 26, and provide an overflow for thinned oil from the hopper 10.

The main tank is filled with oil through a filler pipe 28, oil being supplied to the tank until it spills over the top of the pipe 28. A cap 29 covers the filler pipe 28 and prevents the escape of oil.

Operation

In operation, oil is supplied to the main tank 5 through the oil supply pipe 28, the oil flowing into the tank and through the inwardly opening flap valves 15 and into the hopper 10. The tank 5 and hopper 10 are filled until oil reaches the level of the upper edge of the pipe 28.

When the engine is started the oil pressure pump draws oil from the hopper 10, causing the level of oil in the hopper to drop.

When the oil level in the hopper 10 drops, pressure from the oil in the main oil tank 5 causes the valves 15 and 15' to open, and admit fresh oil to the hopper until the level of the oil in the hopper 10 builds up to that in the main tank 5.

When the oil drawn from the hopper 10 by the oil pressure pump has circulated through the engine it is drawn into an oil scavenging pump (not shown) and returned under pressure to the oil inlet nozzle 24. The oil scavenging pump normally has a greater capacity than the oil pressure pump, and as a result the oil which is returned to the oil tank has considerable air mixed with it. As the oil leaves the end of the nozzle 24 the baffles 23 direct it toward the edge of the tray and provides a circuitous path for the oil between the nozzle 24 and the hopper 10.

Since the oil is spread out in a thin film over the tray it has ample opportunity to deaerate, the escaped air passing out through the apertures or vents 25 into the main tank 5 and out of main tank 5 through the vent 26 to the atmosphere.

When it is desired to shut the engine down in cold weather, the pilot, estimating what the temperature will be when the engine is restarted, opens a valve (not shown) in the oil line and bleeds a predetermined quantity of gasoline from the gas tank into the circulating oil. The oil thus thinned is returned to the hopper, and because of the addition of the gasoline to the oil, the level of the mixture in the hopper 10 rises above the level of the oil in the main oil tank 5. Pressure is thus maintained on the hopper side of the valves 15 causing those valves to remain closed and prevent intermingling of the thinned oil in the hopper 10 with the fresh oil in the main oil tank 5.

The oil in the hopper may have been thinned to such an extent that the increased volume causes the oil to rise above the level of the vents thus causing the oil-gasoline mixture to spill out through the vents 25. The oil that does spill out through the vents 25 is lighter in specific gravity than the undiluted oil and hence floats on top of the fresh oil.

By the time the engine is restarted under such cold weather operation, the undiluted oil in the main tank 5 has solidified and hence when the level of oil in the hopper drops the upper valves 15' open to admit the thinned oil, while the lower valves 15 remain closed due to the solidified condition of the undiluted oil. Thus all the thinned oil returns to the hopper before fresh oil is added from the main tank 5.

As the engine heats up the gasoline in the oil evaporates restoring the full lubricating qualities to the oil.

As oil is used by the engine, the valves 15 open to permit fresh oil to replace that used by the engine without permitting the old oil to mix with the fresh oil.

It is realized that the invention hereinbefore described is susceptible to various modifications and the invention therefore contemplates such changes in size, shape, arrangement of parts as may fall within the scope of the appended claims.

What is claimed as new and desired to secure by Letters Patent is:

1. A device of the character described comprising a main oil tank having an inlet for fresh oil, a top inlet for used oil and a top outlet to the atmosphere for the escape of vapors, a hopper in said main oil tank, said hopper having an outlet to convey conditioned oil for use, a tray above said hopper having an aperture therethrough, a curved surface joining the periphery of said aperture with the interior of said hopper to support said tray against the top interior surface of the main oil tank and to permit oil to flow from said tray into said hopper without turbulence, and means on the tray and associated oil inlet means to direct oil returning to said tank in a thin stream and in a circuitous path upon said tray to deaerate the same.

2. A device of the character described comprising a main oil tank having an inlet for fresh oil, a top inlet for used oil and a top outlet to the atmosphere for the escape of vapors, a hopper in said main oil tank having an open upper end, said hopper having an outlet to convey conditioned oil for use, a tray upon said hopper, said tray having a downwardly curved opening joined with the open end of said hopper to permit flow of oil from said tray into said hopper without turbulence, means to direct oil returning to said tank in a thin stream about the periphery of said tray, and means comprising vertical baffles providing a tortuous circuitous path between the oil directing means and the hopper.

3. A device of character described comprising a main oil tank, a hopper mounted in said main oil tank and adapted to receive replenishing oil therefrom and also to receive diluent, there being apertures above said hopper and in communication therewith to permit overflow oil with diluent to pass from said hopper into said main oil tank, valve controlled openings in said hopper adjacent the lower end thereof to admit replenishing oil thereto from the main oil tank, and valve controlled openings adjacent the upper end of said hopper to readmit overflow oil from the main oil tank to said hopper.

4. A device of the character described comprising a main oil tank, having an inlet for fresh oil, a top inlet for used oil and a top outlet to the atmosphere for the escape of vapors, a hopper in said main oil tank having an open upper end, said hopper having an outlet to convey conditioned oil for use, a tray upon said hopper and extending substantially to the top of said tank, said tray having a downwardly curved opening joined with the open end of said hopper to permit flow of oil from the tray into the hopper without turbulence, apertures in said tray to permit air and also overflowing oil to pass from the hopper into the tank, means with a thin wide outlet to direct oil into said tank in a thin stream about the periphery of the tray, and arcuate baffles on the tray to direct the oil in a circuitous path upon the tray and to the hopper.

5. A device of the character described comprising a main oil tank, having an inlet for fresh oil, a top inlet for used oil and a top outlet to the atmosphere for the escape of vapors, a hopper mounted in said main oil tank and adapted to receive replenishing oil therefrom, said hopper having an outlet to convey conditioned oil for use, a tray upon said hopper having its side wall extending substantially to the top of the tank and containing a central aperture with a downwardly curved surface joining it with the hopper, there being a plurality of apertures in the upper wall part of the tray to permit overflowing oil and also air from the tray to pass into the upper part of the oil tank, and means including openings adjacent the upper end of the hopper adapted to readmit overflowing oil from the tank into the hopper.

6. A tank device of the character described for use with an airplane engine, said device comprising a main oil tank, a hopper mounted in said main oil tank and adapted to receive replenishing oil therefrom and also to receive diluent lighter than said oil, there being apertures above the hopper and in communication therewith to permit overflowing oil with diluent to pass from the hopper into the main oil tank, openings adjacent the upper end and adjacent the lower end of the hopper to admit replenishing oil thereto from the tank, and control valves on said openings to prevent the flow of oil from said hopper into said tank, the upper valve controlled openings being effective in readmitting oil with diluent from the upper part of the oil in the tank into the hopper while the lower portion of the tank oil is still congealed during starting of the engine at low temperature.

WILLIAM WEITZEN.

REFERENCES CITED

The following references are of record in the file of this patent:

UNITED STATES PATENTS

| Number | Name | Date |
| --- | --- | --- |
| 1,095,478 | Strohbach | May 5, 1914 |
| 1,403,650 | Skidmore | Jan. 17, 1922 |
| 1,749,561 | Cadman | Mar. 4, 1930 |
| 2,187,646 | Darrieus | Jan. 16, 1940 |
| 2,188,801 | Worth | Jan. 30, 1940 |
| 2,312,495 | Soucek | Mar. 2, 1943 |
| 2,326,051 | Miller | Aug. 3, 1943 |
| 2,364,119 | Anderson | Dec. 5, 1944 |